(12) United States Patent
Hu

(10) Patent No.: US 8,687,563 B2
(45) Date of Patent: Apr. 1, 2014

(54) SIMULTANEOUS SENSING AND DATA TRANSMISSION

(75) Inventor: Wendong Hu, San Jose, CA (US)

(73) Assignee: STMicroelectronics, Inc., Coppell, TX (US)

(*) Notice: Subject to any disclaimer, the term of this patent is extended or adjusted under 35 U.S.C. 154(b) by 1587 days.

(21) Appl. No.: 11/966,718

(22) Filed: Dec. 28, 2007

(65) Prior Publication Data

US 2008/0165754 A1    Jul. 10, 2008

Related U.S. Application Data

(60) Provisional application No. 60/884,160, filed on Jan. 9, 2007.

(51) Int. Cl.
*G06F 15/16* (2006.01)
*G06F 15/173* (2006.01)
*H04W 4/00* (2009.01)

(52) U.S. Cl.
USPC ........... 370/329; 370/252; 370/314; 370/401; 370/455; 709/220; 709/224

(58) Field of Classification Search
USPC .......................................................... 370/329
See application file for complete search history.

(56) References Cited

U.S. PATENT DOCUMENTS

| | | | |
|---|---|---|---|
| 5,170,500 A * | 12/1992 | Broderick | 455/315 |
| 5,528,623 A * | 6/1996 | Foster, Jr. | 375/133 |
| 5,722,061 A * | 2/1998 | Hutchison et al. | 455/245.1 |
| 5,822,361 A | 10/1998 | Nakamura et al. | |
| 5,896,375 A * | 4/1999 | Dent et al. | 370/347 |
| 6,031,863 A | 2/2000 | Jusa et al. | |
| 6,417,729 B1 * | 7/2002 | Lemay et al. | 330/129 |
| 7,085,306 B1 | 8/2006 | Voldman et al. | |
| 7,366,202 B2 * | 4/2008 | Scherzer et al. | 370/480 |
| 7,545,753 B2 * | 6/2009 | Stirbu | 370/252 |
| 7,577,910 B1 * | 8/2009 | Husemann et al. | 715/744 |
| 7,586,990 B2 | 9/2009 | Subramanian et al. | |
| 7,599,421 B2 * | 10/2009 | Sorrells et al. | 375/147 |
| 7,633,897 B2 * | 12/2009 | Bender et al. | 370/328 |

(Continued)

FOREIGN PATENT DOCUMENTS

EP    0 709 983       5/1996
EP    1672947 A1 *   6/2006

(Continued)

OTHER PUBLICATIONS

Stevenson, Carl R., Cordeiro, Carlos, Sofer, Eli, Chouinard, Gerald, IEEE P802.22 Wireless RANs Functional Requirements for the 802.22 WRAN Standard doc.:IEEE 802.22-05/0007r46, Submission by Carl R. Stevenson, WK3C Wireless LLC, Sep. 2005, pp. 1-49.

(Continued)

*Primary Examiner* — Melvin H Pollack
(74) *Attorney, Agent, or Firm* — Hogan Lovells US LLP

(57) ABSTRACT

In order to satisfy the conflicting requirements for spectrum sensing and QoS of data transmission, it is highly desirable for a cognitive radio system, e.g. IEEE 802.22 WRAN, to perform spectrum sensing and data transmission simultaneously. Embodiments of the invention address critical issues of self-interference generated from a transmission unit to the co-located sensing unit when the simultaneous sensing and data transmission technique is applied. A number of interference mitigation techniques are described and analysis are given.

10 Claims, 2 Drawing Sheets

(56) References Cited

U.S. PATENT DOCUMENTS

| | | | |
|---|---|---|---|
| 7,697,595 B2* | 4/2010 | Nagarajan et al. | 375/148 |
| 7,715,343 B2* | 5/2010 | Tomioka | 370/329 |
| 7,756,058 B2* | 7/2010 | Cordeiro et al. | 370/252 |
| 7,787,572 B2* | 8/2010 | Scharf et al. | 375/346 |
| 7,813,700 B2* | 10/2010 | Zheng et al. | 455/63.1 |
| 7,831,679 B2* | 11/2010 | Apacible et al. | 709/209 |
| 7,843,847 B2* | 11/2010 | Quigley et al. | 370/252 |
| 7,899,028 B2* | 3/2011 | Semper | 370/350 |
| 7,917,145 B2* | 3/2011 | Mahany et al. | 455/435.1 |
| 2006/0018284 A1* | 1/2006 | Rudolf et al. | 370/332 |
| 2006/0281404 A1 | 12/2006 | Lee et al. | |
| 2007/0100922 A1 | 5/2007 | Ashish et al. | |
| 2007/0104140 A1 | 5/2007 | Ashish et al. | |
| 2007/0115878 A1 | 5/2007 | Ashish et al. | |
| 2007/0117537 A1 | 5/2007 | Hui et al. | |
| 2007/0223419 A1 | 9/2007 | Ji et al. | |
| 2007/0248076 A1 | 10/2007 | Ji et al. | |
| 2007/0249341 A1 | 10/2007 | Chu et al. | |
| 2007/0264952 A1 | 11/2007 | Buchwald et al. | |
| 2008/0075033 A1* | 3/2008 | Shattil | 370/328 |
| 2008/0159362 A1* | 7/2008 | Gelbman et al. | 375/219 |
| 2008/0247483 A1* | 10/2008 | Seyedi-Esfahani | 375/267 |
| 2008/0259859 A1* | 10/2008 | Cordeiro et al. | 370/329 |
| 2009/0040986 A1* | 2/2009 | Cordeiro et al. | 370/338 |
| 2009/0047916 A1* | 2/2009 | Haykin | 455/115.1 |
| 2009/0067354 A1* | 3/2009 | Gao et al. | 370/310 |
| 2009/0110033 A1* | 4/2009 | Shattil | 375/141 |
| 2009/0161610 A1* | 6/2009 | Kang et al. | 370/329 |
| 2009/0190537 A1* | 7/2009 | Hwang et al. | 370/329 |
| 2009/0219909 A1* | 9/2009 | Ko et al. | 370/343 |
| 2009/0252048 A1* | 10/2009 | Liang et al. | 370/252 |
| 2009/0252096 A1* | 10/2009 | Liu et al. | 370/329 |
| 2009/0286565 A1* | 11/2009 | Liu et al. | 455/522 |
| 2009/0310586 A1* | 12/2009 | Shatti | 370/338 |
| 2010/0029235 A1* | 2/2010 | Bouillet | 455/226.2 |
| 2010/0037284 A1* | 2/2010 | Sachs | 726/1 |
| 2010/0165952 A1* | 7/2010 | Sung et al. | 370/335 |
| 2010/0173586 A1* | 7/2010 | McHenry et al. | 455/62 |
| 2010/0216414 A1* | 8/2010 | Muterspaugh | 455/83 |
| 2010/0302956 A1* | 12/2010 | Haverty | 370/252 |
| 2011/0090939 A1* | 4/2011 | Diener et al. | 375/136 |
| 2011/0131260 A1* | 6/2011 | Mody | 708/5 |

FOREIGN PATENT DOCUMENTS

| | | |
|---|---|---|
| EP | 1 850 611 | 10/2007 |
| JP | 6-139856 | 1/1996 |
| JP | 11-110707 | 11/2000 |
| JP | 2002-135345 | 2/2003 |
| WO | 2007031957 A2 | 3/2007 |
| WO | 2007031961 A2 | 3/2007 |

OTHER PUBLICATIONS

Cordeiro, Carlos, Challapali, Kiran, Dagnachew, Birru, Shankar, N. Sai, IEEE 802.22: The First Worldwide Wireless Standard based on Cognitive Radios, Philips Research USA, Briarcliff Manor, NY, Nov. 8-11, 2005, pp. 328-337.

Sengupta, Shamik, Brahma, Swastik, Chatterjee, Mainak, Shankar, N. Sai, Enhancements to cognitive radio based IEEE 802.22 air-interface, Electrical Engineering and Computer Science, University of Florida, Corporate R&D Systems Engineering, Qualcomm Inc., San Diego, CA, Jun. 24-28, 2007, pp. 5155-5160.

Cordeiro, Carlos, Challapali, Kiran, Dagnachew, Birru, Shankar, N. Sai, IEEE 802.22: An Introduction to the First Wireless Standard based on Cognitive Radios, Philips Research North America, Briarcliff Manor, Qualcomm Inc., San Diego, CA, Journal of Communications, vol. 1, No. 1, Apr. 2006, Academy Publisher, pp. 38-47.

Wendong Hu et al., "Cognitive Radios for Dynamic Spectrum Access—Dynamic Frequency Hopping Communities for Efficient IEEE 802.22 Operation", IEEE Communications Magazine, IEEE Service Center, Piscataway, US, XP011181061, ISSN 0163-6804, col. 44, No. 5, May 1, 2007, pp. 80-87. Abstract, p. 81, left-hand-column, line 32—right-hand column, line 31, p. 82, left-hand column, line 5—p 84, left-hand column, line 23, fig. 4.

Japanese Office Action with English translation, Patent Application No. 2008-2131, dated Jan. 27, 2012, pp. 5.

Chang et al., IEEE 802.22 WRAN Merger Framework, IEEE P802.22 Wireless RANs, Mar. 7, 2006, pp. 1-7, doc.: IEEE 802.22-06/0030r4.

Hu, W., Interference Mitigation for Simultaneous Sensing and Data Transmission in IEEE 802.22, IEEE P802.22 Wireless RANs, Jan. 8, 2007, pp. 1-7, doc.: IEEE 802.22-07/0017r0.

Abstract, p. 81, left-hand-column, line 32—right-hand column, line 31, p. 82, left-hand column, line 5—p. 84, left-hand column, line 23, fig. 4.

* cited by examiner

SIMULTANEOUS SENSING AND DATA TRANSMISSION

This application claims the benefit of U.S. Provisional Patent Application No. 60/884,160, filed on Jan. 9, 2007, which is hereby incorporated by reference for all purposes as if fully set forth herein.

BACKGROUND OF THE INVENTION

1. Field of the Invention

The invention relates, in general, to communication systems that include cognitive radios and/or software defined radios (SDRs) to achieve efficient and reliable spectrum use without harmful interference to incumbent services such as television (TV) receivers. More particularly, the invention relates to a method, and systems/devices configured to perform such a method, for controlling spectrum use by base stations and consumer premise equipment so as to allow unlicensed radios or other communication devices to operate in broadcast bands previously set aside for licensed users or services such as the TV broadcast bands. The method and related systems may be developed in some embodiments to comply with standards and protocols distributed by the Institute of Electrical and Electronics Engineers (IEEE) 802.22 Working Group.

2. Discussion of the Related Art

The IEEE formed the IEEE 802.22 Working Group to develop protocols for an interoperable air interface for use in spectrum allocated to TV broadcast service and to provide wireless services such as broadband access a point-to-multipoint wireless regional area network (WRAN).

The WRAN system is intended to provide packet-based transport capabilities in wireless broadband services such as internet access, data transport, streaming video, VoIP, and other services that are presently available to much of the population using digital subscriber (DSL) technologies or digital cable modems.

WRAN technology has been initially targeted at wireless broadband or remote access for users in geographically dispersed, sparsely populated areas. The use of TV broadcast bands or UHF bands as a license exempt spectrum for WRAN provides a non-line of sight transmission range of up to 100 kilometers but more typically 30 to 70 kilometers, which is significantly greater than ranges available with WiFi and wireless networks.

The target markets or users of the WRAN-based services are single family residential units, multi-dwelling units, small office/home office locations, small businesses, and remote public and private campuses. A WRAN system based on IEEE 802.22 protocols will likely make use, in a non-interfering manner, of unused TV broadcast channels, i.e., TV channels with bandwidths of 6, 7, and 8 MHz in a frequency range of 41 to 910 MHz (e.g., 54 to 862 MHz in the United States with a 6 MHz channel bandwidth).

An IEEE 802.22 system is generally a fixed point-to-multipoint wireless air interface in which the point is a base station (BS) that manages its own cell or coverage area and all associated consumer premise equipments (CPEs) or multipoints. Each CPE represents a user of the wireless services provided by the BS operator. During operations, the BS controls the access medium in its cell such as by setting the channel used for BS and CPE broadcasts to form the wireless link. The BS transmits in the downstream to the various CPEs, which respond back to the BS in the upstream direction, and these communications may be thought of as downlink and uplink communications or signals. The BS and CPE need to be designed to communicate without interfering with licensed or primary users. With this in mind, the BS manages spectrum or channel usage and uses sensing of existing channels to protect incumbent or primary users.

In some proposed WRAN, each BS operates on a single channel for an operation period, e.g., up to two seconds as presently indicated by IEEE 802.22 protocols, and then performs sensing during a quiet period, e.g., 20 to 100 milliseconds depending on sensing technology and mechanisms utilized by the BS and CPEs. If an incumbent or other use of the channel is sensed, the BS halts operations until the channel becomes available. A single channel WRAN is effective in protecting incumbent services, but halting operations or data transmissions during a quiet time results in underutilization of the channel to transmit digital data (e.g., in about every two second period there is up to 100 milliseconds without transmissions).

Hence, there remains a need for improved methods, and devices that implement such methods, for managing use and allocation of the radio spectrum in WRAN and other networks that communicate over channels in unused but licensed bands such as by using the TV bands of the radio spectrum.

SUMMARY OF THE INVENTION

Accordingly, the invention is directed to simultaneous sensing and data transmission that substantially obviates one or more of the problems due to limitations and disadvantages of the related art.

An advantage of the invention is to minimize interruption and transmission delays, thereby increasing transmission throughput.

Another advantage of the invention is to provide a system having minimal interference.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, the present invention is directed towards a method for use in wireless regional area network (WRAN) systems including providing a WRAN cell operated by a BS to wirelessly communicate with at least one consumer premise equipment, operating the BS to determine a channel available for use and initializing the channel to provide an in-band channel for data transmission, and simultaneously performing spectrum management and spectrum sensing on a plurality of out-of-band channels and data transmission on the in-band channel.

In another aspect of the invention, as embodied and broadly described, the present invention is directed towards a method for use in wireless regional area network (WRAN) systems including providing a WRAN cell operated by a BS to wirelessly communicate with at least one consumer premise equipment, operating the BS to determine a channel available for use and initializing the channel to provide an in-band channel for data transmission, simultaneously performing spectrum management and spectrum sensing on a plurality of out-of-band channels and data transmission on the in-band channel wherein the simultaneous performance of spectrum management, spectrum sensing on a plurality of out-of-band channels, and data transmission is capable of operating at an interference below about −116 dBm with interference mitigation techniques.

In yet another aspect of the invention, as embodied and broadly described, the present invention is directed towards a system for simultaneous data transmission, spectrum sensing, and spectrum management including a BS and at least one coupled to the BS by a radio air interface. The BS and at least one user transceiver utilize interference mitigation techniques to allow the system to operate at an interference below about −116 dBm during the simultaneous data transmission, spectrum sensing, and spectrum management.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE ILLUSTRATED EMBODIMENTS

Reference will now be made in detail to an embodiment of the present invention, examples of which are illustrated in the accompanying drawings.

Figure 1:
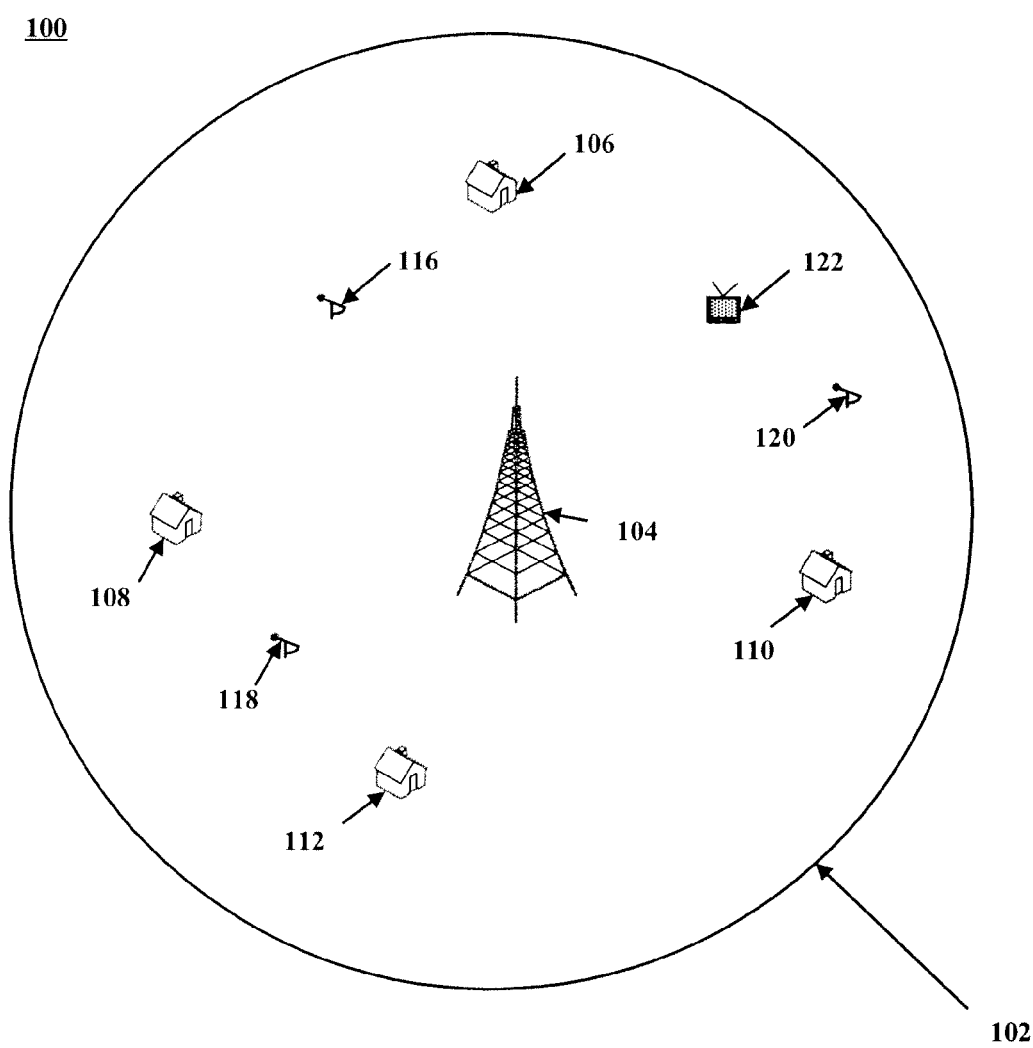
FIG. 1 is a diagram illustrating a system according to an embodiment of the invention.

FIG. 1 illustrates a system 100 having a service area 102. Typically, the service area includes about a 30 km to 70 km coverage area or larger. In this embodiment, the service area 102 is a WRAN cell and includes a BS 104 and a plurality of CPEs 106, 108, 110, and 112 scattered throughout the service area 102. There is also a plurality of part 74 devices, e.g., microphones, 116, 118, and 120 scattered throughout the service area 102. In addition, there is also a digital television (DTV) receiver 122 within the service area 102.

The BS 104 and associated CPEs 106, 108, 110, and 112 that communicate to the BS 104 via fixed point-to-multiple radio air interface are not shown in detail in FIG. 1, but in IEEE 802.22 embodiments include, e.g., a transmitter and receiver equipment to facilitate communication over the TV band. The BS 104 and associated CPEs 106, 108, 110, and 112, may be configured according to cognitive radio technologies to include equipment for sensing use of frequencies or channels and to process such sensed energies or information to make channel selection decisions. In one embodiment, the BS 104 and CPEs 106, 108, 110, and 112 include a transmitting antenna and sensing antenna, a transmitter transmitting at a transmission power, and a guard band.

The communication between the BS 104 and associated CPEs 106, 108, 110, and 112 is performed while protecting part 74 devices, 116, 118, and 120 or primary services, such as existing TV broadcasters/receivers. The use of distributed sensing performed by the CPEs 106, 108, 110, and 112 is reported to the BS 104 for processing to allow coordinated channel selection.

Each BS 104, in accordance with an embodiment of the invention, is configured generally in accordance with IEEE 802.22 or other wireless network protocol and/or specifications so as to provide a particular wireless service with transmitters and/or receivers as necessary to communicate with a plurality of CPEs 106, 108, 110, and 112.

Figure 2:
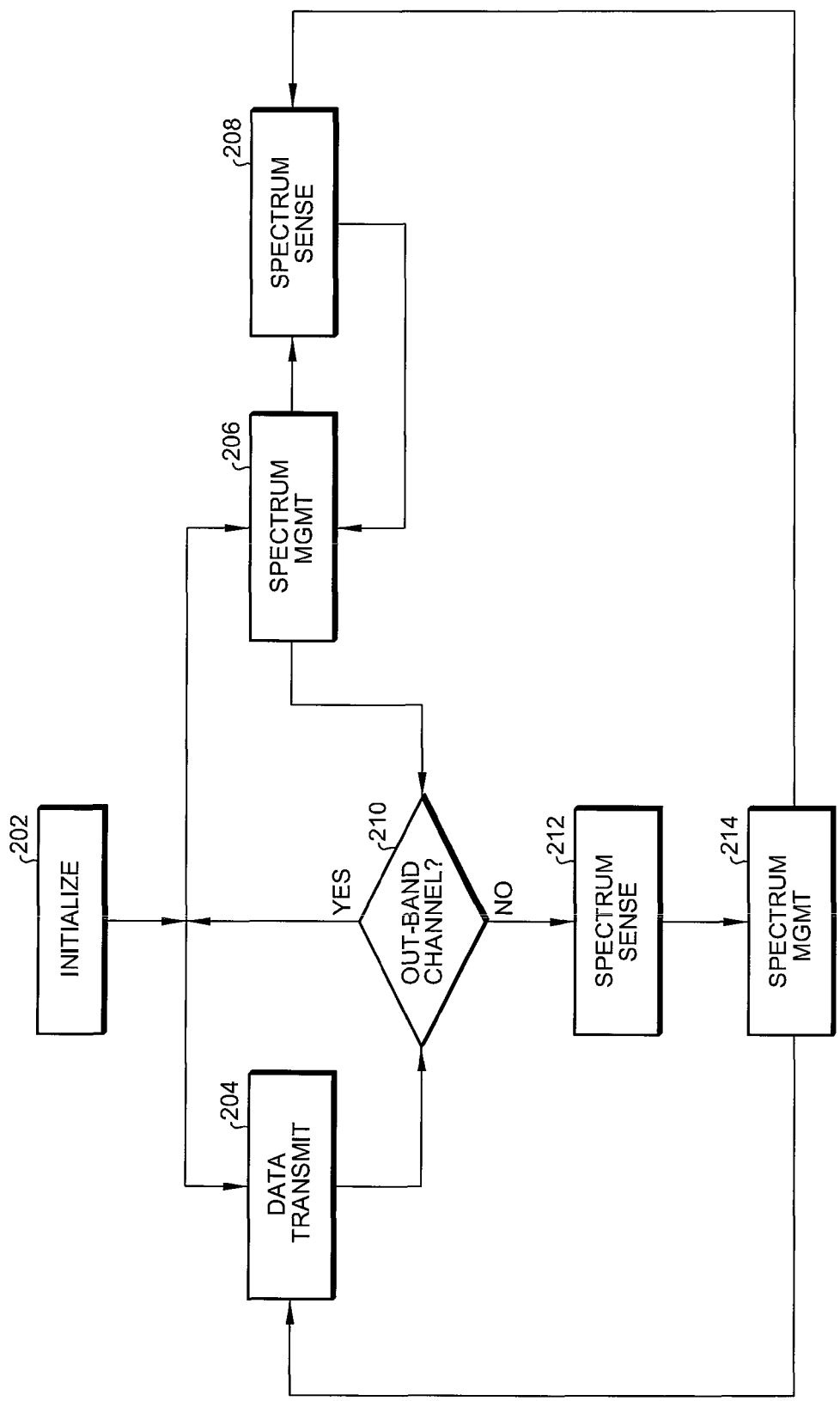
FIG. 2 is a flow diagram illustrating a method of operation according to another embodiment of the invention.

FIG. 2 is a flow diagram illustrating a method of operation according to another embodiment of the invention.

More specifically, FIG. 2 illustrates an embodiment utilizing a simultaneous sensing and data transmission (SSDT) technique. Referring now to FIG. 2, the method 200 starts 202 with an initialization of the system. The initialization of the system is performed as known in art. For example, the initialization of the system may include initializing one of a set of channels to provide an in-band channel for subsequent data transmission. An in-band channel includes an operating channel to be used for communication between the BS 104 and CPEs 106, 108, 110, and 112.

After the initialization of the system 202, simultaneous data transmission 204 on an in-band channel and spectrum management 206 and spectrum sensing 208 are performed on a set of out-band channels. An out-band channel includes all the other available channels that may be used as candidate channels for future communication between the BS 104 and CPEs 106, 108, 110, and 112. Spectrum sensing is a technology that a system, e.g., a radio system, uses to determine the spectrum availability through observation and analysis of the frequency spectrum, e.g., radio frequency, as known in the art.

The spectrum sensing may be employed by the BS 104 and/or CPEs 106, 108, 110, and 112, and used in a cognitive radio system, such as the IEEE 802.22 system, which operates on a secondary basis, to identify unused radio frequency channels in the spectrum that is allocated to licensed services. The simultaneous spectrum sensing and data transmission should be performed to be in compliance with the IEEE 802.22 standard. The IEEE 802.22 standard requires that unlicensed operations of the cognitive radio system shall not cause any harmful interference to the licensed operations of the primary users, such as TV broadcasters and wireless microphones in the TV spectrum. In general, there is no obligation for the primary systems to adjust their operational behaviors in order to coexist with the secondary devices. Therefore, the system 100, including BS 104 and CPEs 106, 108, 110, and 112, is able to reliably detect the presence of the licensed operations in its proximity through spectrum sensing that satisfies a variety of restricted sensitivity requirements. The IEEE 802.22 standard sets forth a maximally allowed data transmission time of two seconds, therefore, the maximum allowable detection time is two seconds.

In one embodiment, the spectrum sensing technique is configured to detect a digital television signal (such as ATSC) as low as −116 dBm, which corresponds to an approximately 22 dB margin below the power noise level. Moreover, the probability of detection shall be at least 90%, while no more than 10% of false alarm is permitted in the IEEE 802.22 requirements. The 802.22 requirements are shown in C. R. Stevenson, C. Cordeiro, E Sofer, G. Chouinard, "Functional Requirements for the 802.22 WRAN Standard", IEEE 802.22-05/0007r46, September 2005, which is hereby incorporated by reference.

In embodiments of the invention, there are a number of digital signal processing techniques that may be used to effectively perform spectrum sensing for BS 104 and/or CPEs 106, 108, 110, and 112 of the invention, These techniques may include at least one of match filtering, energy detection, cyclostationary feature detection, and others as known in the art.

Match filtering may be conducted as known in the art. For example, match filtering may be conducted as described in J.

Proakis, Digital Communications, 3rd edition, McGraw Hill, Chapter 5.1.2, which is hereby incorporated by reference. Energy detection may be conducted as known in the art. For example, energy detection may be conducted as described in A. Sahai, N. Hoven, R. Tandra, "Some Fundamental Limits on Cognitive Radio", Proc. of Allerton Conference, Monticello, October 2004, which is hereby incorporated by reference. Cyclostationary feature detection may be conducted as known in the art. For example, it may be conducted as described in W. A. Gardner, "Signal Interception: A Unifying Theoretical Framework for Feature Detection", IEEE Trans. on Communications, vol. 36, no. 8. August 1988, which is hereby incorporated by reference.

It is noted that when one of these sensing techniques is utilized independently by BS 104 and/or CPEs 106, 108, 110, and 112, the performance may be degraded significantly. This performance degradation results in part from multipath fading and shadowing. Accordingly, cooperative spectrum sensing by BS 104 and CPEs 106, 108, 110, and 112 has been considered as a way to minimize performance degradation by offering a distributed framework to cooperatively collect signal strengths of licensed incumbents from spectrum sensors in various locations within a service area 102.

The spectrum management 206 on an out-of-band channel includes a high level analysis. More specifically, in order to effectively avoid harmful interference to licensed incumbents, a cognitive radio system shall be capable of identifying the availability of the RF channels through well-managed spectrum sensing operations as described herein, classifying the available channels, and making intelligent decisions on dynamic channel selection and transmission power control for its data transmission. These management and control tasks are spectrum management.

As discussed herein, spectrum sensing can be performed on in-band channels or out-of-band channels. An in-band channel to a cognitive radio refers to a radio frequency channel on which the cognitive radio is currently operating, and also includes channels on which incumbent operations can be directly impaired by cognitive radio's operation on its operating channel, e.g. the first adjacent channels. Out-of-band channels include all other alternative channels. Prior to scheduling any measurement activity, a cognitive radio determines the most appropriate channels to be sensed to achieve the goals of incumbent protection and system performance.

The cognitive radio's transmission will degrade the sensitivity of the spectrum measurement, it is generally required that spectrum sensing only be performed during quiet periods in which no cognitive radio's transmission is allowed on the measured channel in order to meet the sensitivity requirements. According to the digital signal processing technique employed for spectrum sensing, a specific duration of the quiet period should be allocated so as to collect a sufficient amount of measurement data. In addition, a cognitive radio system shall control its sensing function to ensure that incumbent detections are conducted in a timely manner, e.g. in IEEE 802.22 standard, a TV broadcaster's presence must be detected within two seconds once its operation begins.

Distributed spectrum sensing is typically used to overcome degradation of sensing performance due to multi-path fading and shadowing effect. In this case, the sensing activities on a variety of cognitive radio stations shall be coordinated through a central controller, e.g. a BS. The central controller is responsible to instruct all the associated cognitive radio stations as to what channel to sense, when to sense, how long the sensing has to be performed, and how the measurement data is reported. After receiving all measurement data, the central controller consolidates and analyzes the sensing results and determines the channel availability and condition that are valid for the whole system. In IEEE 802.22, a BS manages all the sensing activities that are performed in the associated CPEs using a rich set of management tools as known in the art.

In addition to managing the spectrum sensing function, another important task of spectrum management is to keep track of the channel condition and classify the channel availability for a set of RF channels. Typically, channels that are identified through spectrum sensing as being temporarily used by incumbent users are marked as occupied channels, while the ones indicated in an incumbent database that are permanently occupied by incumbents are denoted as disallowed channels. For those channels that are available, e.g. free of incumbent users, the cognitive radio system maintains an ordered back-up channel list in which priority is assigned to each of the available channels based on its channel conditions. The maximally allowed transmission power is typically imposed on each backup channel. Such power limits are determined by the distance between the cognitive radio system and the incumbent users that are potentially interfered with. The geographical location of the cognitive radio system is given and that of the incumbent users can be identified through satellite-based or terrestrial-based techniques.

Spectrum management of a cognitive radio system allows intelligent selection of an appropriate operating channel on which data transmission will not cause harmful interference to the licensed incumbent services and at the same time can provide the best possible quality of service and performance to the system. This task is referred to as dynamic frequency selection (DFS). The operation of DFS is performed based on the prioritized back-up channel list that is constituted according to the results of spectrum sensing, incumbent database access and geographical location estimation.

The simultaneous data transmission 204, spectrum management 206, and spectrum sensing 208 on out-band-channels enables improved performance by substantially preventing the periodic interruptions of data transmissions that are required on a non-hopping mode 802.22 system. More specifically, a channel that is to be sensed cannot be used for data transmission. Therefore, a WRAN cell operating consistently on a single channel must interrupt about every two seconds for sensing and continue to transmit on that channel only if no incumbent channel is detected. This non-hopping mode is described in Dynamic Frequency Hopping Communities for Efficient IEEE 802.22 Operation, IEEE Communications Magazine, May 2007, which is hereby incorporated by reference.

Referring to FIG. 2, a decision 210 is made from information retrieved from the spectrum management 206 and spectrum sensing 208 on out-of-band channels. The decision point 210 is a yes or no decision, which is based on whether there is another available out-of-band channel. If there is another available out-band channel available, the data transmission begins transmission on that channel and the loop is repeated. That is, a yes decision criteria is reached and simultaneous data transmission 204, spectrum management 206, and spectrum sensing 208 on out-band-channels is again performed thus repeating the loop.

If an out-band-channel is not available, then a non-hopping mode is performed as known to one of ordinary skill in the art. That is, data transmission is terminated and spectrum sensing 212 and spectrum management 214 on in-band channels is performed to determine whether the in-band channel is available for transmission, e.g., whether an incumbent is detected. The spectrum sensing 212 on an in-band channel includes techniques as described herein. The spectrum management 214 on an in-band channel includes procedures as known in the art and described herein. Data transmission 204 is continued on the in-band channel only if no incumbent channel is detected. After data transmission 204 is continued, the loop is repeated. Simultaneous sensing 208 and management 206 on the out-band channel may be performed while data transmission 204 is performed on the in-band channel.

As discussed, the simultaneous spectrum management 206, spectrum sensing 208, and data transmission 204 should be performed to be in compliance with the IEEE 802.22 standard. However, the performance of simultaneous spectrum sensing and data transmission generates additional interference as compared to standard non-hopping mode systems. Accordingly, interference mitigation techniques are utilized in embodiments of the invention in order minimize the interference and ensure compliance with the IEEE 802.22 standard.

The interference mitigation techniques reduce interference, e.g., they reduce interference between a transmission unit and sensing unit of the BS 104 and/or CPEs 106, 108, 110, and 112. By applying a number of interference mitigation techniques from a transmission unit of the BS 104 and/or CPEs 106, 108, 110, and 112 to the co-located sensing unit of the BS 104 and/or CPEs 106, 108, 110, and 112 interference can be suppressed to a level much lower than the thermal noise, e.g., to a level lower than about −106 dBm for a 6 Mhz bandwidth and the required sensitivity of the sensing receiver to a level lower than about −116 dBm, so that the simultaneous sensing and data transmission functionality may be performed with substantially minimal performance degradation and with IEEE 802.22 regulatory compliance.

The interference mitigation techniques may be implemented in any of the embodiments and include at least one of an out-of-band emission mask of the transmitter, transmission power control of the transmitter, output filter of the transmitter, input filter of the sensing receiver, antenna side lobe suppression, antenna polarization, adaptive antenna, and antenna positioning. Each of these interference mitigation techniques will now be discussed.

An out-of-band emission mask may be used to reduce interference on the transceiver of a BS 104 and/or CPEs 106, 108, 110, and 112, thereby protecting a DTV receiver 122 and part 74 devices 116, 118, and 120. The out-of-band emission mask will be described in reference to a maximum field strength limit. The maximum field strength limit has been proposed according to IEEE 802.22 functional requirement document, Carl Stevenson, et al. "IEEE 802.22-05/0007r46 Functional Requirements for the 802.22 WRAN Standard", Sep. 22, 2005, which is hereby incorporated by reference. The maximum field strength limit proposed in order to protect DTV receivers and to protect part 74 devices, e.g., wireless microphones, is shown in Table 1.

TABLE 1

| Maximum Field Strength Limit | | |
|---|---|---|
| | If WRAN operates | |
| | Case A: First adjacent channel to wireless microphone (Field Strength Limit) | Case B: 2nd adjacent channel and beyond to TV or wireless microphone (Field Strength Limit) |
| WRAN first adjacent channel | 4.8 dB (uV/m) | 200 dB (uV/m) |

TABLE 1-continued

| Maximum Field Strength Limit | | |
|---|---|---|
| | If WRAN operates | |
| | Case A: First adjacent channel to wireless microphone (Field Strength Limit) | Case B: 2nd adjacent channel and beyond to TV or wireless microphone (Field Strength Limit) |
| limit (120 kHz bandwidth) | | |
| WRAN first adjacent channel limit (Scaled 6 MHz channel) | 30.6 dB (uV/m) | 63 dB (uV/m) |
| WRAN second adjacent channel and beyond limit (120 kHz bandwidth) | 4.8 dB (uV/m) | 4.8 dB (uV/m) |
| WRAN second adjacent channel and beyond limit (Scaled 6 MHz channel) | 30.6 dB (uV/m) | 30.6 dB (uV/m) |

The maximum field strength limit for BS 104 and CPEs 106, 108, 110, and 112 transmitting at a power of about 4 W effective isotropic radiated power (EIRP) is shown in Table 1. Referring to Table 1, the maximum field strength limits are measured for BS 104 and CPEs 106, 108, 110, and 112 transmitting at a power of about 4 W EIRP at 3 m in 120 kHz bandwidth. The maximum field strength limits are shown for two cases, i.e., Case A and Case B. The maximum field strength limits for each case have also been scaled from a 120 kHz bandwidth channel to a 6 MHz bandwidth channel as known in the art.

Given these maximum field strength limits, the minimum amount of an out-of-band emission mask rejection may now be calculated with equation 1.

$$\text{MaximumFieldStrength}=10\log_2(\text{EIRP})-\log_2(4*3.14*3^2)+10\log_{10}(0.12/(10\log_2(\text{EIRP}))+145.8. \quad \text{Equation 1}$$

TABLE 2

| Out of Band Emission Mask Rejection | | |
|---|---|---|
| | Case A | Case B |
| First adjacent channel | 100.4 dB | 68 dB |
| Second adjacent channel and beyond | 100.4 dB | 100.4 dB |

More specifically, Table 2 shows the minimum amount of interference that needs to be filtered to meet the IEEE 802.22 requirements calculated from Equation 1. Of course, more may be filtered and/or other mitigation techniques may be used.

Transmission power control of the transmitter may also be utilized as an interference mitigation technique. In one embodiment, the maximum transmission of the BS 104 and/or CPEs 106, 108, 110, and 112 is about 4 W EIRP. Preferably, a minimum transmission power should be used by service carriers for the service coverage whenever possible as an interference mitigation technique.

An output filter of transmitter on a BS 104 and/or CPEs 106, 108, 110, and 112 may also be used as an interference mitigation technique. In one embodiment, for example, a typical low cost pass band cavity filter can provide about 15 dB filtering on a first channel and about 40 dB filtering on an adjacent channel. In one embodiment, the output filter and the out-of-band emission mask are combined as shown in Table 3 to illustrate a maximum interference level to maintain compliance with IEEE 802.22 as described herein.

TABLE 3

Maximum Interference

|  | Case A | Case B |
|---|---|---|
| First adjacent channel | 115.4 dB | 83 dB |
| Second adjacent channel and beyond | 140.4 dB | 140.4 dB |

Referring to Table 3, it is shown that for Case A and a first adjacent channel the maximum interference that can be caused by data transmitting and sensing is about 115.4 dB. That is, the maximum allowable interference is increased by the output filter rejection capabilities.

In addition, an input filter may also be utilized with a sensing receiver on a BS 104 and/or CPEs 106, 108, 110, and 112 as an interference mitigation technique. In one embodiment, a radio receiver provides an adjacent channel, e.g., the first channel, with an input filter having a rejection capability ranging from about 30 to about 40 dB and on an alternate channel, e.g., 2nd adjacent channel having a rejection capability of about 60 dB. The input filter may be used to increase the maximum allowable interference of data transmitting and sensing similarly as described with regard to the output filter.

Antenna side lobe suppression may also be used with a sensing receiver on a BS 104 and/or CPEs 106, 108, 110, and 112 as an interference mitigation technique. In one embodiment, for a directional antenna, the side lobes should be at least 30 dB down from the main lobe peak at elevation and 10 dB at azimuth, e.g., at an angle of 90 degrees from the bore direction. In another embodiment, for an omni-directional antenna, the side lobes along the axis should be at least 20 dB down from the main lobe peak.

Antenna polarization may be also used with a sensing receiver on a BS 104 and/or CPEs 106, 108, 110, and 112 as an interference mitigation technique. In one embodiment, the transmission system and sensing system should use different antenna polarizations. The cross polarization isolation is about 10 dB to about 15 dB. The transmitting antenna should use vertical polarization to allow maximum isolation toward nearby outdoor TV receiving antennas. On the other hand, the sensing antenna should be horizontally polarized in order to sense a TV signal.

Adaptive antenna may be optimized with antennas on a BS 104 and/or CPEs 106, 108, 110, and 112 as an interference mitigation technique as known in the art. For example, they may be configured as described in Frank B. Gross, "Smart Antennas for Wireless Communications with Matlab", McGraw-Hill, 2005, which is hereby incorporated by reference.

Antenna positioning should also be considered with antennas on a BS 104 and/or CPEs 106, 108, 110, and 112 as an interference mitigation technique. In one embodiment, the following factors should be considered: sensitivity of the antenna, operating frequency, transmitter antenna gain, sensing receiver antenna gain, antenna separation, and/or antenna isolation, e.g., horizontal isolation or vertical isolation. By varying these factors the antenna my be optimized.

In the BS 104 and/or CPEs 106, 108, 110, and 112 of the invention, simultaneous sensing and data transmission using collocated sensing and transmission units are possible with no performance degradation on spectrum sensing when an appropriate guard band between the transmission channel and the channel being sensed is used. The required width of the guard band depends on the following factors: out-of-band emissions of the transmitter, performance of transmitter output filter, performance of sensing receiver input filter, directional antenna performance (side lobe suppression, adaptive antenna), antenna polarization, antenna positioning (space separation and orientation), and sensing receiver sensitivity. A typical guard band of a single bandwidth channel is required between the channel of the sensing receiver and the data transmitter. Preferably, a guard band of about 6 MHz or more may be used.

Next, a theoretical example utilizing various mitigation techniques will be considered. In this theoretical example the CPEs 106, 108, 110, and 112 may be configured with two specifications having interference mitigation techniques shown in Table 4.

TABLE 4

CPEs Configuration

| Element | Specification One | Specification Two |
|---|---|---|
| Transmit antenna and sensing antenna mounting orientation | Same axial vertically | Same horizontally |
| Transmitter | WRAN CPE | WRAN CPE |
| Transmission Power | 4 W EIRP (36 dBm) | 4 W EIRP (36 dBm) |
| Guard band | 6 MHz (1 channel) | 6 MHz (1 channel) |
| Out-of-band Emission Mask | −68 dB (1st adjacent channel) −100.4 dB (2nd adjacent channel) | −68 dB (1st adjacent channel) −100.4 dB (2nd adjacent channel) |
| Transmitter antenna gain | 10 dB | 10 dB |
| Sensing receiver antenna gain | 0 dB | 0 dB |
| Output/input filter rejection | 40 dB | 40 dB |
| Transmit antenna polarization | Vertical | Vertical |
| Sensing antenna polarization | Horizontal | Horizontal |
| Transmitter antenna side lobe suppression (omni-directional) | 20 dB | 20 dB |
| Receiver antenna side lobe suppression (omni-directional) | 20 dB | 20 dB |
| Antenna isolation (horizontal isolation) |  | 27.81 dB |
| Antenna isolation (vertical isolation) | 59.62 dB |  |

Further in this theoretical example the BS 104 may be setup as having interference mitigation techniques shown in Table 5.

TABLE 5

BS Configuration

| Element | Specification One |
|---|---|
| Transmit antenna and sensing antenna mounting orientation | Same axial vertically |
| Transmitter | WRAN CPE |
| Transmission Power | 4 W EIRP (36 dBm) |
| Guard band | 6 MHz (1 channel) |
| Out-of-band Emission Mask | −68 dB (1st adjacent channel) −100.4 dB (2nd adjacent channel) |
| Transmitter antenna gain | 12 dB |
| Sensing receiver antenna gain | 0 dB |
| Output/input filter rejection | 40 dB |
| Transmit antenna polarization | Vertical |
| Sensing antenna polarization | Horizontal |
| Transmitter antenna side lobe suppression (omni-directional) | 20 dB |

TABLE 5-continued

BS Configuration

| Element | Specification One |
|---|---|
| Receiver antenna side lobe suppression (omni-directional) | 20 dB |
| Antenna isolation (horizontal isolation) | |
| Antenna isolation (vertical isolation) | 59.62 dB |

From this theoretical configuration, the theoretical interference on the second adjacent channel may be calculated with Equation 2 below:

$$(TX\text{ power(dBm)}) + (TX\text{ antenna gain(dBm)}) + (\text{sensing antenna gain(dBm)}) - (\text{out-of-band emission mask (dBm)}) - (\text{input filter rejection(dBm)}) - (\text{cross polarization(dBm)}) - (\text{side lobe suppression (dBm)}) - (\text{antenna isolation(dBm)}) = (\text{interference on adjacent channel(dBm)})$$

Equation 2

Equation 2 was used in a theoretical calculation of interference on the second adjacent channel for the theoretical example. The results are shown in Table 6

TABLE 6

Theoretical Interference on adjacent channel

| Element | Interference on second adjacent channel |
|---|---|
| Base Station | −207.02 dBm <<< −116 dBm |
| CPE Specification 1 | −209.02 dBm <<< −116 dBm |
| CPE Specification 2 | −137.21 dBm <<< −116 dBm |

As shown in Table 6, by applying a number of interference mitigation techniques, interference can be suppressed below the IEEE 802.22 requirement of −116 dBm. That is, the interference while using simultaneous sensing and data transmission of a transmission unit to a co-located sensing unit can be suppressed to a level much lower than the thermal noise and required sensitivity of the sensing receiver. Accordingly, simultaneous sensing and data transmission functionality can be performed without performance degradation of the system.

It will be apparent to those skilled in the art that various modifications and variations can be made to the invention without departing from the spirit or scope of the invention. Thus, it is intended that the present invention covers the modifications and variations of this invention provided they come within the scope of the appended claims and their equivalents.

What is claimed is:

1. A method for use in wireless regional area network (WRAN) systems comprising:
    initially performing spectrum sensing and determining a channel available for data transmission, which is the in-band channel;
    initializing the in-band channel to provide the data transmission;
    simultaneous with the data transmission, using channel sensors at base stations to determine the availability of out-band channels for the data transmission;
    using mitigation techniques to suppress interference from the data transmission on the in-band channel into out-band channels;
    managing spectrum availability, including determining if there is another out-band channel available for the data transmission;
    if yes, periodically switching the data transmission to an available channel and repeating the above method steps;
    and if no, then entering a non-hopping mode for the data transmission.

2. The method of claim 1, wherein the spectrum sensing is performed by match filtering.

3. The method of claim 1, wherein the spectrum sensing is performed by energy detection.

4. The method of claim 1 wherein the spectrum sensing is performed by cyclostationary feature detection.

5. The method of claim 1, wherein the interference mitigation techniques comprise a guard band, transmission power control of the transmitter, an output filter of the transmitter, an input filter of a sensing receiver, an antenna side lobe suppression, antenna polarization, an adaptive antenna, and optimization of antenna positioning.

6. A method for use in wireless regional area network (WRAN) systems comprising:
    initially performing spectrum sensing and determining a channel available for data transmission, which is the in-band channel;
    initializing the in-band channel to provide the data transmission;
    simultaneous with the data transmission, using channel sensors to determine the availability of out-band channels for the data transmission;
    using mitigation techniques at both base stations and at consumer premises equipment to suppress interference from the data transmission on the in-band channel into the out-band channels;
    managing spectrum availability, including determining if there is another out-band channel available for the data transmission;
    if yes, periodically switching the data transmission to an available out-band channel and repeating the above method steps;
    and if no, then entering a non-hopping mode for the data transmission.

7. The method of claim 6, wherein the spectrum sensing is performed by match filtering.

8. The method of claim 6, wherein the spectrum sensing is performed by energy detection.

9. The method of claim 6, wherein the spectrum sensing is performed by cyclostationary feature detection.

10. The method of claim 6, wherein the interference mitigation techniques comprise a guard band, transmission power control of the transmitters, an output filter of the transmitters, an input filter of a sensing receiver, an antenna side lobe suppression, antenna polarization, an adaptive antenna, and optimization of antenna positioning.

* * * * *